US008417592B1

(12) United States Patent
Kumar (10) Patent No.: US 8,417,592 B1
(45) Date of Patent: Apr. 9, 2013

(54) INVENTORY OF LIBRARIES (75) Inventor: Ranjit Kumar, Santa Clara, CA (US)

(73) Assignee: EMC Corporation, Hopkinton, MA (US)

( * ) Notice: Subject to any disclaimer, the term of this patent is extended or adjusted under 35 U.S.C. 154(b) by 921 days.

(21) Appl. No.: 11/585,319

(22) Filed: Oct. 23, 2006

(51) Int. Cl.
*G06Q 40/00* (2012.01)

(52) U.S. Cl.
USPC ............................................................ 705/28

(58) Field of Classification Search ..................... 705/28; 711/114
See application file for complete search history.

(56) References Cited

U.S. PATENT DOCUMENTS 5,870,732 A * 2/1999 Fisher et al. ...................... 707/1
5,963,971 A * 10/1999 Fosler et al. .................. 711/114
6,324,497 B1 * 11/2001 Yates et al. ...................... 703/24
7,055,008 B2 * 5/2006 Niles et al. ..................... 711/162
2005/0080992 A1 * 4/2005 Massey et al. ................ 711/114

OTHER PUBLICATIONS

W. W. Peterson and D. T. Brown, Cyclic Codes for Error Detection, Proceedings of the IRE, Jan. 1961, pp. 228-235.*

* cited by examiner

*Primary Examiner* — Russell S Glass
(74) *Attorney, Agent, or Firm* — Van Pelt, Yi & James LLP (57) ABSTRACT

Determining efficiently whether it is necessary to re-inventory a storage media library, such as a tape library, is disclosed. It is determined whether a first number computed based at least in part on at least a portion of a new inventory data is the same as a second number computed based at least in part on a corresponding stored inventory data. An update of the stored inventory data is initiated if it is determined that the first number is not the same as the second number.

25 Claims, 6 Drawing Sheets

| Barcode | Slot | Date | Size | . . . |
|---------|------|------|------|-------|
|         |      |      |      |       |
|         |      |      |      |       |
|         |      |      |      |       |
|         |      |      |      |       |

Fig. 6

INVENTORY OF LIBRARIES

BACKGROUND OF THE INVENTION

Automated or partially automated libraries, such as robotic tape or other storage media libraries, and/or associated entities, typically have the ability to inventory the contents of the library and provide the inventory results to a requesting entity, such as a system, application, or other process that requests and/or needs the information, e.g., a backup server and/or application. In the case of a robotic tape (or other media) library, the inventory data typically includes such information as the identity of each volume of media currently available in the library, e.g., a tape name or number read from a bar code or other label affixed to the media volume, and for each volume its current location (e.g., the "slot" or other storage location in which it is currently positioned. Backup servers and/or applications and/or other library users use such information to provide commands to the library in the course of performing, for example, data backup and/or recovery. For example, a backup application might instruct the library to move the volume currently in slot 41 to a designate tape drive A.

Whenever a volume of media is added, removed, moved, or altered, a user of the storage media library, such as a backup server and/or application, may detect the change. However sometimes this may happen in an unexpected fashion. For example, the backup application/agent may determine that the tape library was power cycled, or the front door was opened or it otherwise lost and then regained connection to the tape library. In these or similar situations a full inventory from the library is needed, to ensure that its view of the library contents is still accurate.

Depending on the configuration and/or circumstances, upon receipt of the new inventory information, the requesting user typically to date has either done a slot by slot comparison of the received new inventory data with a stored view of the library contents, to see precisely what has changed, or has simply replaced the previously-stored inventory data with the newly received data, thereby ensuring that the most current and accurate view of the contents is known. For a sizable inventory system, this reconciliation procedure can be time consuming and take up resources like memory, processor cycles, and bandwidth. Much of this effort is wasted in those cases in which a request for new inventory information is triggered but the library contents have not changed. For example users of tape library may open the front door to examine something inside the library, or there could be a disconnect and reconnect to the tape library. In either case tape library user is unsure if the tape library contents changed. Therefore, it would be useful to be able to determine quickly and with minimal resource use, prior to obtaining and/or fully processing new inventory data, whether the library contents have been really changed.

BRIEF DESCRIPTION OF THE DRAWINGS

The present invention will be readily understood by the following detailed description in conjunction with the accompanying drawings, and in which.

DETAILED DESCRIPTION

The invention can be implemented in numerous ways, including as a process, a system, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Determining, prior to reconciling or replacing library inventory data with newly-generated data, whether the newly-generated inventory data is different than corresponding data obtained previously is disclosed. An inventory system described herein has a library that maintains and/or is able to generate and/or otherwise provide an inventory of items in the library, including for example information such as the identity (e.g., name, volume number, serial number, title, or other identifier) of each item and the location in which it is located. In some embodiments, a number is computed based on newly-generated inventory data to determine if the library contents have changed. The number computed based on the newly-generated inventory data is compared to a corresponding saved number that was computed based on previously-received inventory data. If the two numbers are different, it is concluded that the library contents have changed.

In some embodiments, a cyclic redundancy check (CRC), cryptographic hash, or other hash function is used to compute the number. In other embodiments, different hash or other functions are used to compute the number. Any function or numerical operation that would generate the same result when computed based on previously-generated and/or received inventory data as it would when computed based on newly-generated and/or received inventory data if the previously-generated and/or received inventory data is the same as the newly-generated and/or received inventory data, and conversely would generate a different result when computed based on previously-generated and/or received inventory data as it would when computed based on newly-generated and/or received inventory data if the previously-generated and/or received inventory data is different than the newly-generated and/or received inventory data, may be used.

In some embodiments, a determination that the library contents have changed triggers a reconciliation. In various embodiments, reconciliation includes replacing the previously-generated and/or received inventory data with the newly-generated and/or received inventory data; determining one or more differences between the previously-generated and/or received inventory data on the one hand and the newly-generated and/or received inventory data on the other; or both.

Figure 1:
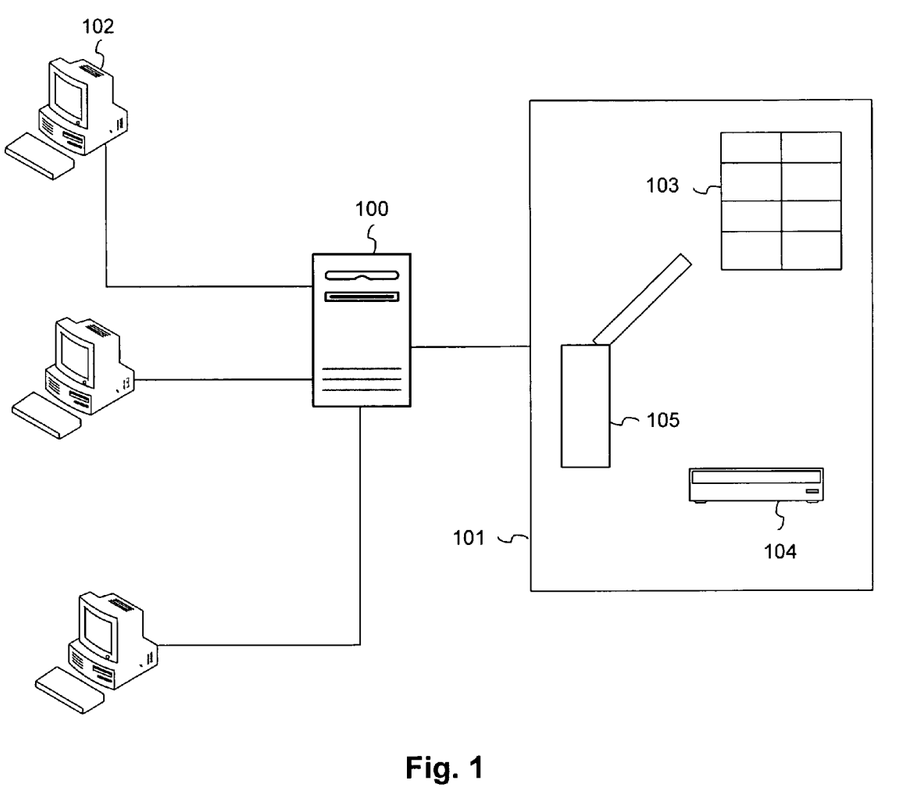
FIG. 1 shows an embodiment of a file backup system.

FIG. 1 shows an embodiment of a file backup system. In the example shown, a file server 100 is connected to a tape library 101. Library 101 stores tapes in numbered slots 103. Each tape has a machine-readable label, such as a barcode, which can be read by library 101, e.g., to collect inventory data indicating which tape is in which slot. It also has a tape reader 104, e.g., a tape drive, and a robotic arm 105 which is capable of scanning the barcodes. Arm 105 is also capable of moving a tape among slots 103 and tape reader 104. Library 101 and/or a host associated therewith in some embodiments includes logic that enables the library 101 to use robotic arm 105 to take an inventory of tapes in library 101, e.g., to sequentially read the label on each tape in the library, and provide as output inventory data that includes a list of tapes and for each the corresponding slot in which it is located.

When a user of a host 102 requests via server 100 an operation that requires that a storage tape in library 101 be accessed, e.g., a backup or restore operation, server 100 checks its record to identify the required tape and its corresponding slot in library 101. It then sends a request to library 101 to mount on tape reader 104 the tape located in the slot in which the required tape is believed by server 100 to reside. Depending on the embodiment, server 100 then reads at least part of the contents of the tape directly, using tape reader 104, to find at least tape identifying information. If the server 100 receives an indication that the tape in tape reader 104 is not the one the server 100 intended to mount, or receives any other indication that suggests that the server 100 may not have a completely accurate view of the current inventory state of the library 101, a re-inventory of tape contents is initiated.

Another scenario is that if a person such as a system administrator has accessed the tapes in library 101 physically, e.g., an indication is received that a door to the library 101 has been opened since the server 100 last received inventory data, a re-inventory is initiated as well, to determine whether the library contents have been altered, e.g., by adding, removing, and/or moving tapes. However, in both scenarios, it is possible that the record on the server is still up-to-date with the library content. Therefore, determining whether new inventory data is different than previously-received data prior to using the new data to update a view of library contents is disclosed.

Figure 2:
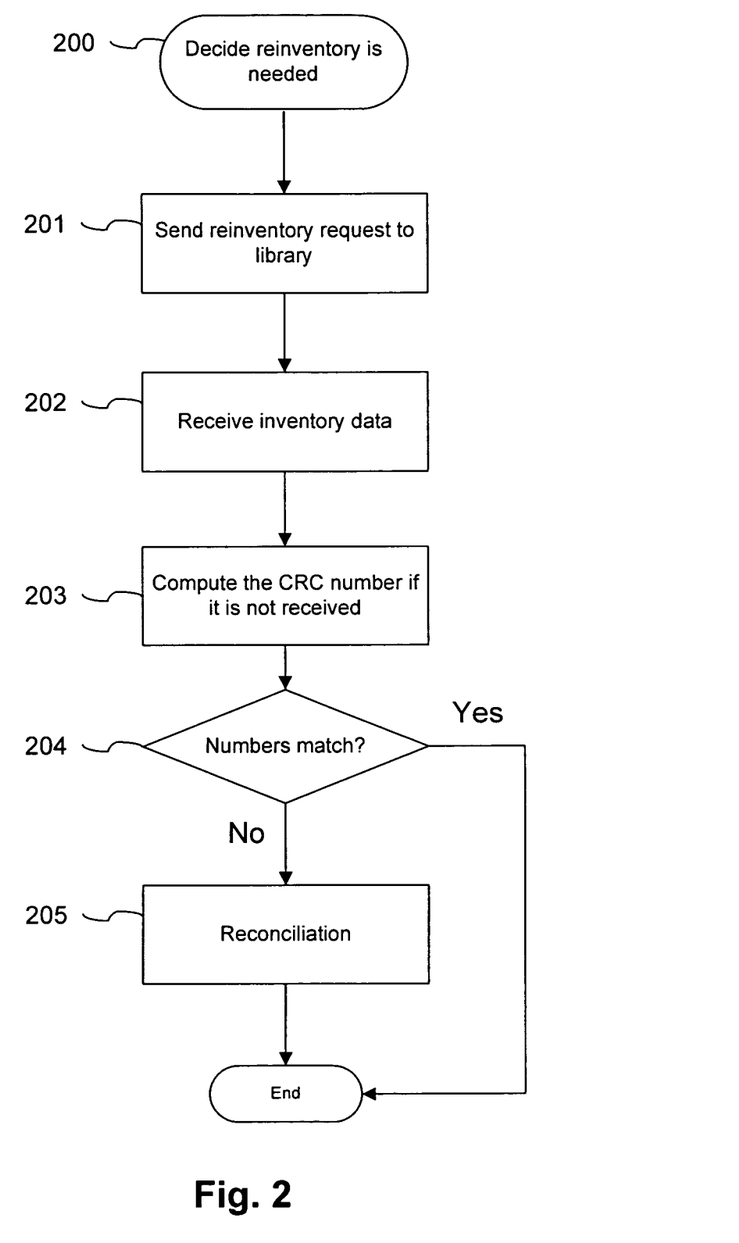
FIG. 2 is a flowchart illustrating an embodiment of a process to update inventory data if required.

FIG. 2 is a flowchart illustrating an embodiment of a process to update inventory data if required. In some embodiments, the process of FIG. 2 is implemented on a backup server such as server 100 of FIG. 1. In the example shown, upon receipt of an indication that a view of the contents of a library may not be completely accurate (200), a re-inventory request (201) is sent to the library to scan all its tapes. Inventory data is received (202). If a CRC (or other) number computed based on the inventory data is not received with and/or in connection with the received inventory data, the CRC number is computed based on the received inventory data (203). In some embodiments, the library or another upstream node computes the CRC based on the inventory data, and 203 is omitted. In some embodiments, the library may or may not be configured to compute the CRC, and in such embodiments a determination is made at 203 whether a CRC was received, and if not the CRC is computed by a host or other entity that received the inventory data, e.g., from the library or an intermediate node. In some embodiments, the CRC is not computed by the library or any intermediate node and a CRC is always computed at 203. It is determined whether the received and/or computed number is the same as a corresponding saved number computed based on a corresponding prior inventory data (204). If the two numbers match, it is concluded that the library contents have not been changed and the process of FIG. 2 ends. Otherwise, reconciliation is performed (205). In some embodiments, reconciliation comprises using the inventory data received at 202 to update a view of the contents of the library. In some embodiments, the inventory data received at 202 is used to replace corresponding stored inventory data. In some embodiments, the inventory data received at 202 is used to determine one or more differences, if any, between the received inventory data and corresponding stored inventory data.

Figure 3:
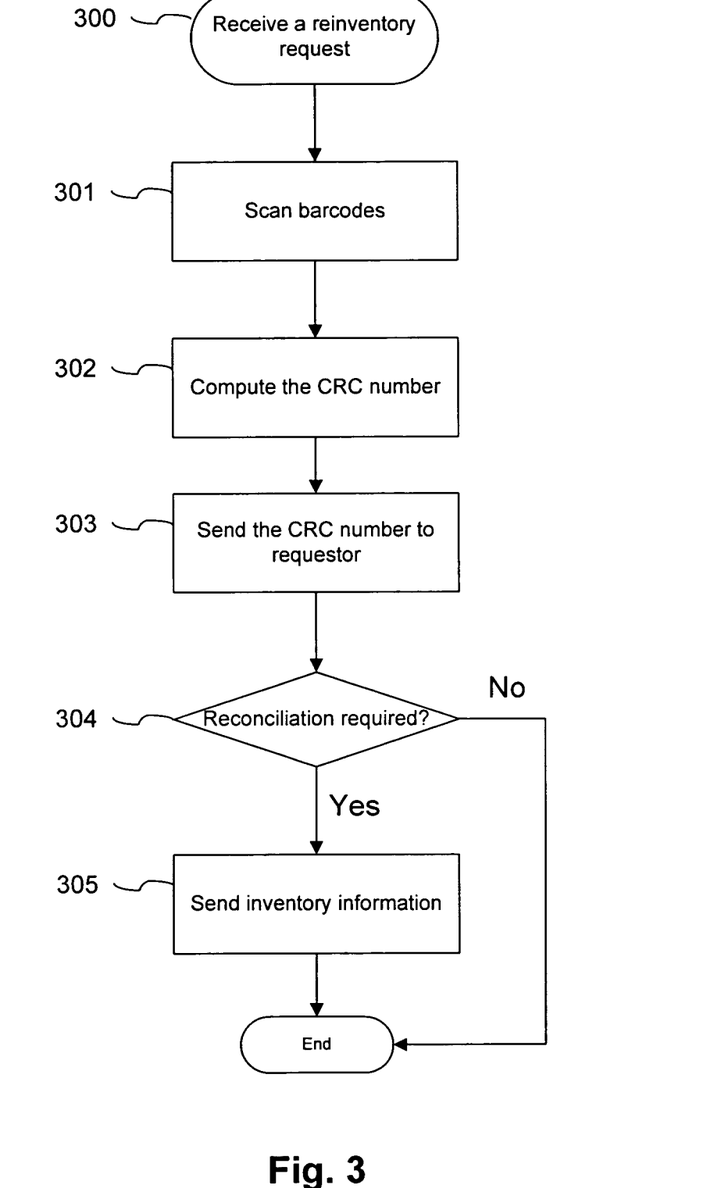
FIG. 3 is a flowchart illustrating an embodiment of an inventory process.

FIG. 3 is a flowchart illustrating an embodiment of an inventory process. In some embodiments, the process of FIG. 3 is implemented by a library, such as library 101 of FIG. 1. An inventory request is received (300). Inventory data is gathered, e.g., by scanning tape barcodes and associating each tape with a corresponding slot number (301). A CRC number is computed based on the barcodes (302) and the number is sent to the entity that requested the inventory (303). In the example shown in FIG. 3, the inventory data itself is not sent at 303. If an indication is received that the inventory data generated at 302 is required by the requesting entity to which the CRC number was sent (304), the inventory data is sent (305). Under the approach shown in FIG. 3, inventory data is not sent from the gathering entity (e.g., library) to a requesting entity (e.g., a backup server and/or intermediate node) unless the requesting entity determines, based on the CRC number, that the newly-generated inventory data is needed. If the requesting entity determines based on the CRC number that the newly-generated data is not needed, e.g., because the CRC number computed based on the newly-generated data is determined to be the same as a corresponding CRC number computed based on previously-received and/or stored inventory data, the inventory data itself is not sent to the requesting entity, saving time, computational resources at the sending and receiving ends, and bandwidth of the communication channel between them. In some alternative embodiments, the both the CRC number and inventory data are sent, without first waiting to receive an indication that a determination has been made, subsequent to the CRC being sent, that the inventory data is needed. In some alternative embodiments, a CRC is not computed by the entity that generates/collects the inventory data, and just the inventory data is sent. In some of the latter embodiments, an entity that receives the inventor computes the CRC number, as in FIG. 2 and FIG. 5 (discussed below).

Figure 4:
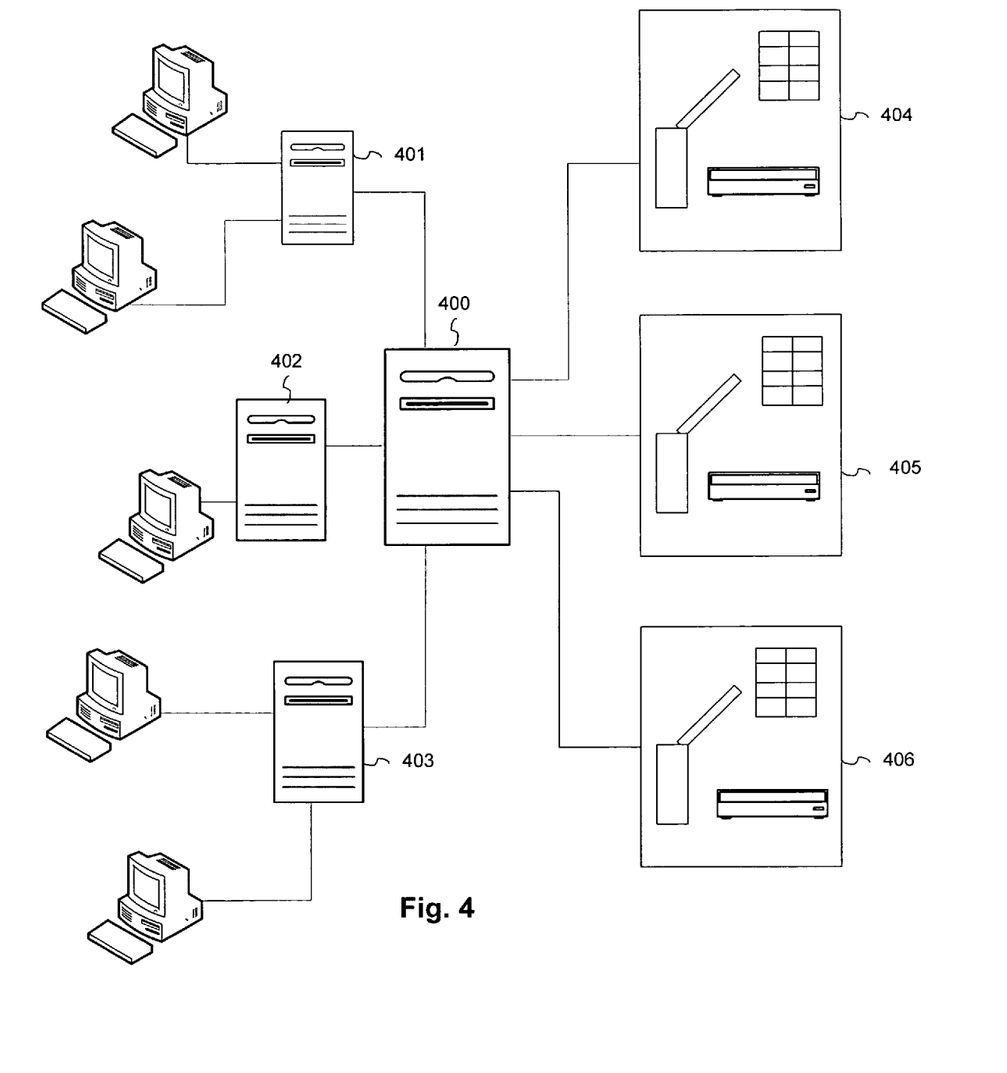
FIG. 4 shows an embodiment of a virtual library system.

FIG. 4 shows an embodiment of a virtual library system. A virtual library is implemented on server 400, which is connected to multiple backup servers and libraries. As far as file backup servers 401, 402, and 403 are concerned, server 400 provides the same interface as a physical tape library, and is thus referred to as a virtual library. The virtual library actually reroutes a received server request to one or more of the physical libraries, 404, 405, or 406 to perform the corresponding operation. It then receives the result and sends it back to the requesting server. Therefore, the physical libraries and the backup servers are shielded from each other by the virtual library. Note that each server might only have access to a subset of the physical libraries that server 400 is connected to.

In some embodiments, a server (e.g., 401-403) that receives an indication that its view of the contents of the virtual library (or a relevant portion thereof) may not be completely accurate sends to the server 400 a re-inventory request. The server 400 sends a re-inventory request to the applicable one(s) of libraries 404-406 and receives inventory data in response. In some embodiments, the server 400 computes a CRC number based on the inventory data, as described above. In some embodiments, the CRC number, but not initially the inventory data, is returned to the requesting one of servers 401-403; and the inventory data is sent to the requesting server only if the requesting server determines based on the CRC number that the requesting server needs to update its view of the virtual library's contents. In some embodiments, the server 400 returns both the CRC number and the inventory data to the server at the same time. In some embodiments, the library initial sends server 400 only the CRC and the server 400 relays the CRC to the requesting one of servers 401-403; the inventory data is obtained by the server 400 and sent to the requesting one of servers 401-403 only if the server 400 receives an indication that the requesting server has determined, based on the CRC, that the inventory data is needed.

Figure 5:
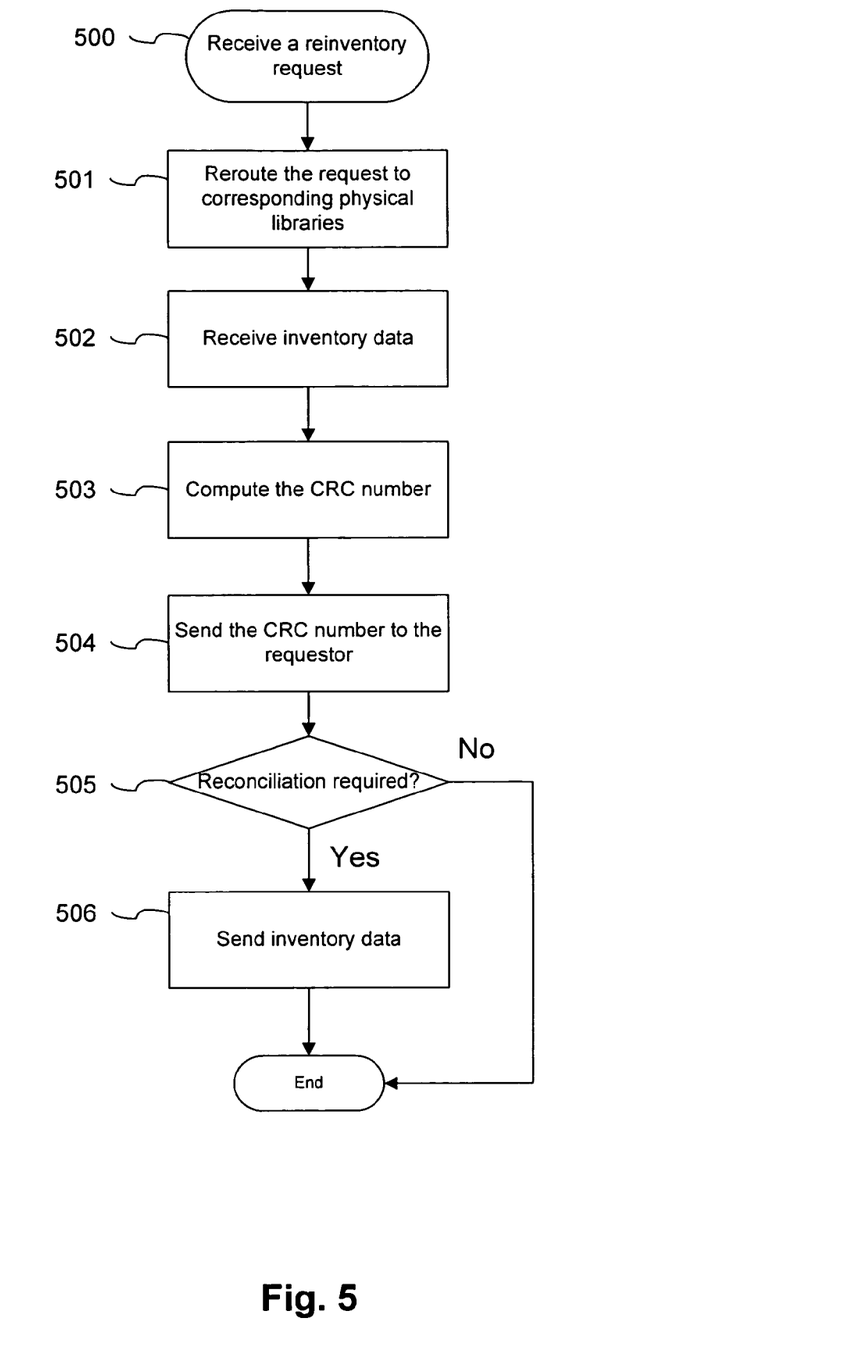
FIG. 5 is a flowchart illustrating an embodiment of a re-inventory process.

FIG. 5 is a flowchart illustrating an embodiment of a re-inventory process. In some embodiments, the process of FIG. 5 is implemented by a virtual library. A re-inventory request is received (500). The re-inventory request is rerouted to the corresponding libraries (501). Inventory data is received (502). A CRC number based on the received inventory data is computed (503). The number is sent to the entity from which the request at 500 was received (504). If an indication is received that the requesting entity needs the inventory data, e.g., because the CRC number does not match a corresponding CRC number computed based on previously-received inventory data (505), the inventory data received at 502 is forwarded to the requesting entity.

The virtual library could be implemented differently in various other embodiments. In one embodiment, the virtual library performs re-inventory and reconciliation processing to keep track of the physical libraries. In another embodiment, the virtual library computes different CRC numbers for different file backup servers based on the respective parts of the virtual library to which each has access. In yet another embodiment, re-inventory and reconciliation are synchronized among the different file backup servers connected to the virtual library so they only need to be performed once when changes are made to the physical libraries.

Figure 6:
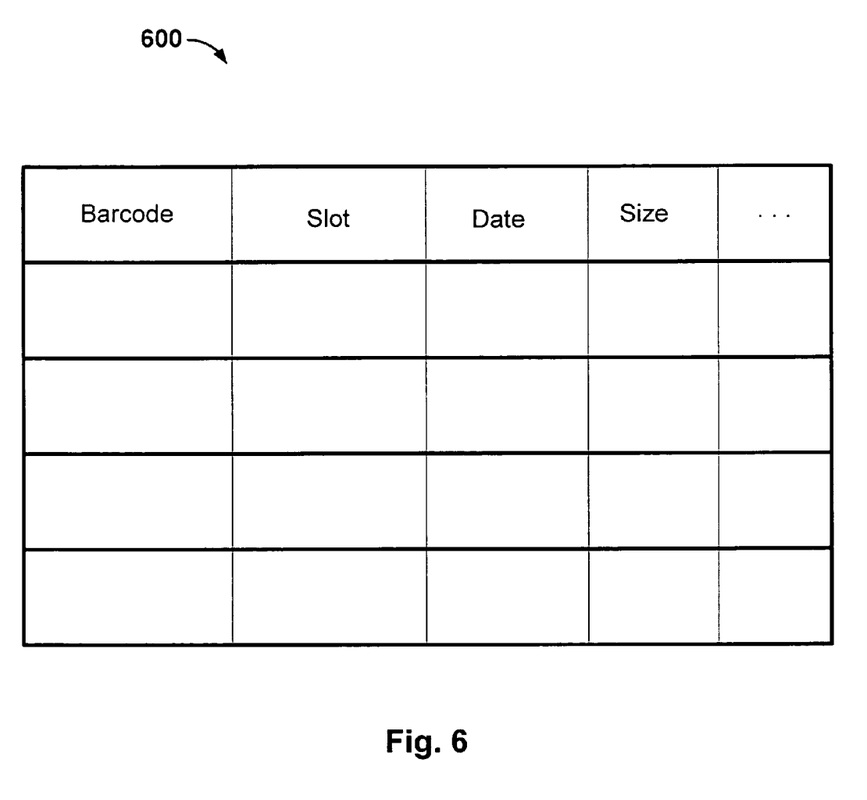
FIG. 6 shows an embodiment of an inventory record.

FIG. 6 shows an embodiment of an inventory record. In some embodiments, the data record 600 of FIG. 6 is used by a backup server to maintain a view of the contents of one or more libraries. More, fewer, or different columns than those shown in FIG. 6, depending on the embodiment and/or configuration.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
 a processor configured to:
  retrieve a stored inventory record, wherein an inventory record includes, for each item of physical media in a robotic data storage media library:
   1) an item identifier representing a machine readable label on the item of physical media; and
   2) a slot number of the item of physical media within the robotic data storage library;
  determine a first number computed by applying a hash function to each item identifier and its corresponding slot number in the stored inventory record;
  receive a re-inventory indication;
  determine a second number computed by applying the hash function to each item identifier and its corresponding slot number in a new inventory record for the robotic data storage media library;
  determine whether the first number is the same as the second number; and
  initiate an update of the stored inventory record if it is determined that the first number is not the same as the second number; and
 a memory coupled to the processor and configured to provide instructions to the processor.

2. A system as recited in claim 1, wherein the processor is further configured to compute the first number.

3. A system as recited in claim 1, wherein the hash function comprises a CRC hash function.

4. A system as recited in claim 1, wherein the robotic data storage library is configured to generate the new inventory record at least in part by reading the respective machine readable label of each item of physical media currently in the robotic data storage library and its corresponding slot number.

5. A system as recited in claim 1, wherein determining the first number includes retrieving the first number from the robotic data storage library which is configured to compute the first number.

6. A system as recited in claim 1, wherein the update of the stored inventory record includes determining one or more differences, if any, between the new inventory record and the stored inventory record.

7. A system as recited in claim 1, wherein the update of the stored inventory record includes replacing the stored inventory record with the new inventory record.

8. A system as recited in claim 1, wherein at least the processor comprises an intermediate node interposed between one or more physical libraries with which the new inventory record is associated and one or more entities configured to perform operations requiring access to resources associated with the one or more physical libraries, the intermediate node being configured to provide to the one or more entities access to the one or more physical libraries via a virtual library interface.

9. A method of inventorying including:
 retrieving a stored inventory record, wherein an inventory record includes, for each item of physical media in a robotic data storage media library:
  1) an item identifier representing a machine readable label on the item of physical media; and
  2) a slot number of the item of physical media within the robotic data storage library;
 determining a first number computed by applying a hash function to each item identifier and its corresponding slot number in the stored inventory record;
 receiving a re-inventory indication;
 determining a second number computed by applying the hash function to each item identifier and its corresponding slot number in a new inventory record for the robotic data storage media library;
 determining whether the first number is the same as the second number; and
 initiating an update of the stored inventory record if it is determined that the first number is not the same as the second number.

10. A method of inventorying as recited in claim 9, further comprising computing the first number.

11. A method of inventorying as recited in claim 9, wherein the hash function comprises a CRC hash function.

12. A method of inventorying as recited in claim 9, wherein the robotic data storage library is configured to generate the new inventory record at least in part by reading the respective machine readable label of each item of physical media currently in the robotic data storage library and its corresponding slot number.

13. A computer program product for inventorying, the computer program product being embodied in a computer readable medium and comprising computer instructions for:
   retrieving a stored inventory record, wherein an inventory record includes, for each item of physical media in a robotic data storage media library:
      1) an item identifier representing a machine readable label on the item of physical media; and
      2) a slot number of the item of physical media within the robotic data storage library;
   determining a first number computed by applying a hash function to each item identifier and its corresponding slot number in the stored inventory record;
   receiving a re-inventory indication;
   determining a second number computed by applying the hash function to each item identifier and its corresponding slot number in a new inventory record for the robotic data storage media library;
   determining whether the first number is the same as the second number; and
   initiating an update of the stored inventory record if it is determined that the first number is not the same as the second number.

14. A robotic data storage library comprising:
   a label reader configured to read a machine readable label associated with an item of physical media; and
   a processor configured to:
      receive an inventory request from a server, based at least in part on a re-inventory indication;
      determine an inventory record, wherein an inventory record includes, for each item of physical media in the robotic data storage library:
         1) an item identifier received from the label reader representing the machine readable label tagged on the item; and
         2) a slot number of the item of physical media within the robotic data storage library;
      compute a number by applying a hash function to each item identifier and its corresponding slot number in the inventory record;
      send the number to the server; and
      in the event the server requests an update, send the inventory record to the server, wherein the server requests an update if it is determined that the number is not the same as a stored number corresponding to a stored inventory record of the robotic data storage library.

15. A system as recited in claim 1, wherein the machine readable label is a bar code.

16. A computer program product as recited in claim 13, wherein the robotic data storage library is configured to generate the new inventory record at least in part by reading the respective machine readable label of each of at least a relevant subset of items in the robotic data storage library.

17. A system as recited in claim 1, wherein the re-inventory indication is a result of opening the robotic data storage media library's front door.

18. A system as recited in claim 1, wherein the re-inventory indication is a result of power cycling the robotic data storage media library.

19. A system as recited in claim 1, wherein the re-inventory indication is a result of disconnecting then reconnecting the robotic data storage media library.

20. A method as recited in claim 9, wherein the re-inventory indication is a result of opening the robotic data storage media library's front door.

21. A method as recited in claim 9, wherein the re-inventory indication is a result of power cycling the robotic data storage media library.

22. A method as recited in claim 9, wherein the re-inventory indication is a result of disconnecting then reconnecting the robotic data storage media library.

23. A computer program product as recited in claim 13, wherein the re-inventory indication is a result of opening the robotic data storage media library's front door.

24. A computer program product as recited in claim 13, wherein the re-inventory indication is a result of power cycling the robotic data storage media library.

25. A computer program product as recited in claim 13, wherein the re-inventory indication is a result of disconnecting then reconnecting the robotic data storage media library.

* * * * *